United States Patent [19]

Knepper

[11] 4,335,564
[45] Jun. 22, 1982

[54] ELECTRONICALLY ACTUATED STONE TRAP TRIP MECHANISM

[75] Inventor: Larimer J. Knepper, New Holland, Pa.

[73] Assignee: Sperry Corporation, New Holland, Pa.

[21] Appl. No.: 246,985

[22] Filed: Mar. 24, 1981

[51] Int. Cl.³ .............................................. A01F 12/10
[52] U.S. Cl. .................................. 56/10.2; 130/27 JT
[58] Field of Search ......................... 56/10.2, DIG. 15; 130/27 JT, 27 R; 209/82

[56] References Cited

U.S. PATENT DOCUMENTS 3,971,390 7/1976 McDuffie et al. ................... 56/10.2
4,146,038 3/1979 DeBusscher et al. .......... 130/27 JT Primary Examiner—Jay N. Eskovitz
Attorney, Agent, or Firm—Larry W. Miller; Frank A. Seemar

[57] ABSTRACT

A trip mechanism, cooperable with an electronic stone detection device on a combine, is disclosed wherein, upon the reception of a signal from the electronic stone detection device indicating that a stone has been detected in the feed path of the crop being harvested, the trip mechanism is operable to effect an unlatching of the trap door to permit the stone to be ejected from the feed path. The trip mechanism includes a solenoid for receiving the signal from the electronic stone detector and for engaging a trip link with a rotating cam member. The cam member causes the trip link to engage a release mechanism which disconnects a latching device from the trap door so that it can move to an open position.

8 Claims, 12 Drawing Figures

ELECTRONICALLY ACTUATED STONE TRAP TRIP MECHANISM

BACKGROUND OF THE INVENTION

The present invention relates generally to the detection and ejection of foreign matter from crop harvesting machines and, more particularly, to a trip mechanism operatively associated with an electronic stone detection device to effect the unlatching of a trap door upon the detection of foreign matter for the ejection thereof from the feed path of the crop harvesting machine.

Generally, crop harvesting machines, commonly referred to as combines, include a crop harvesting header mounted at the forward end thereof to initiate the crop harvesting process. Normally, the harvested crop is consolidated within the header and fed to a centrally located conveying mechanism within a feeder housing. From the feeder housing, the harvested crop is fed to the combine base unit for further harvesting treatment.

It has been found desirable to eliminate non-crop foreign matter from the flow of harvested crop before it reaches the base unit for further harvesting treatment. Foreign matter includes stones, wood and other debris which can be harmful to the harvesting equipment normally housed within the base unit. Combines utilizing the rotary harvesting principal are particularly susceptible to damage from such non-crop foreign matter.

Accordingly, non-crop foreign matter detection devices, commonly referred to as stone traps, have been developed. One such mechanical detection device utilizes a pinch roller mounted a predetermined distance above a trap door such that the flow of crop material is between the pinch roller and the trap door. Non-compressible matter, such as stones, entering the crop flow between the pinch roller and the trap door and having a height greater than the distance between the roller and the trap door, is forced downwardly against the trap door to force the trap door open and eject the foreign matter. Electronic detection devices have also been developed for sensing the presence of such matter and emitting a signal receivable by an ejection mechanism to remove the foreign matter from the flow of crop.

The problem remaining after electronic detection of the foreign matter in the feed path of the crop being harvested is the provision of a mechanism for receiving the signal and tripping the release of the trap door for ejection of the foreign matter. Since a more successfully detection rate of foreign matter could be obtained if both electronic and mechanical detection devices were provided on the crop harvesting machine, it would be advantageous if the trip mechanism could interact with the mechanical detection and ejection device.

SUMMARY OF THE INVENTION

It is an object of this invention to overcome the aforementioned disadvantages of the prior art by providing a trip mechanism which is actuated by an electronic stone detection device and which is operable for effecting the release of a trap door from its latching mechanism.

It is another object of this invention to provide a release mechanism which is operatively associated with the trip mechanism to effect a release of a trap door from its latching mechanism when the trip mechanism receives a signal from an electronic detection device indicating that foreign matter has been detected in the feed path of the crop being harvested.

It is a feature of this invention that the trip mechanism utilizes the rotary motion of the mechanical detection device to effect the release of the trap door from its latching mechanism.

It is an advantage of this invention that the trip mechanism can be utilized as a signaling mechansim to indicate a loss of power to the electronic stone detection device.

It is still another object of this invention to provide a trip mechanism operatively associated with an electronic detection device which is operatively compatable with mechanical detection and ejection devices.

It is another feature of this invention that a trip mechanism is provided to allow both electronic and mechanical detection and ejection devices to be utilized in a compact space on a combine feeder housing.

It is a further object of this invention to provide a trip mechanism that is operable to receive a signal from an electronic stone detection device and to effect the release of a trap door from its latching mechanism so that the stone detected by the electronic detection device can be ejected from the feed path of the crop being harvested.

It is a still further object of this invention to provide an electronically actuated stone trap trip mechansim which is durable in construction, inexpensive of manufacture, carefree of maintenance, facile in assemblage and simple and effective in use.

These and other objects, features and advantages are accomplished according to the instant invention by providing a trip mechanism cooperable with an electronic stone detection device on a combine which, upon reception of a signal from the electronic stone detection device indicating the detection of a stone in the feed path of the crop being harvested, is operable to effect the unlatching of the trap door to permit the stone to be ejected from the feed path. The trip mechanism includes a solenoid for receiving the signal from the electronic stone detector and for engaging a trip link with a rotating cam member. The cam member causes the trip link to engage a release mechanism which disconnects a latching device from the trap door so that it can move to a open position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figures 1, 2:
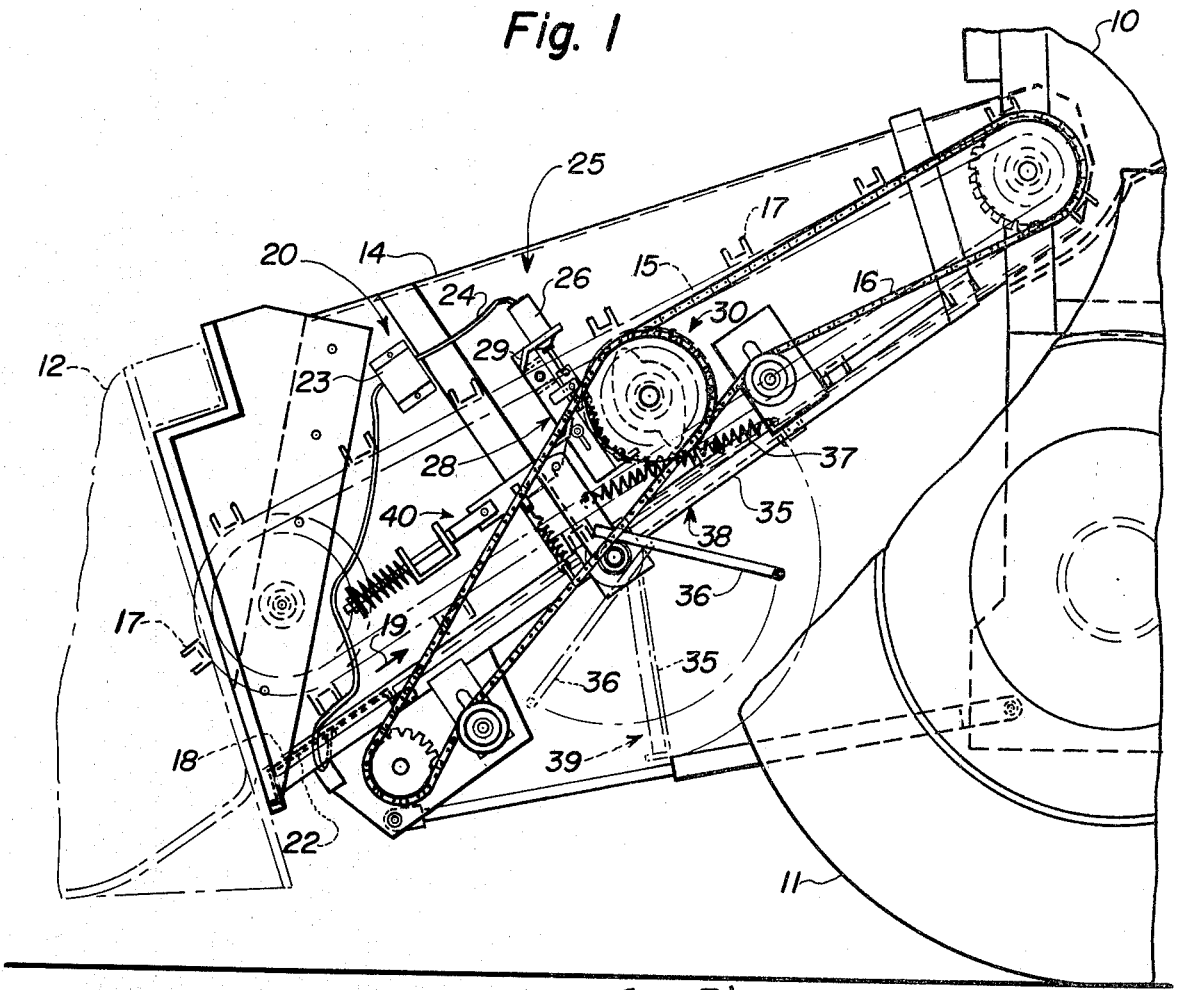
FIG. 1 is a side elevational view of the combine feeder housing incorporating the principals of the instant invention, the combine base unit being shown fragmentally with the front wheel partially removed for clarity, the crop harvesting header being shown fragmentally and in phantom.
FIG. 2 is an enlarged side elevational view of a portion of the feeder housing of FIG. 1, showing the instant invention, most of the drives having been removed for clarity.

Referring now to the drawings and, particularly to FIG. 1, a side elevational view of a feeder housing for a crop harvesting machine, commonly referred to as a combine, can be seen. The combine base unit 10 is mounted on a wheeled frame 11 containing apparatus, not shown, for the harvesting of crop material fed thereto. A forwardly mounted crop harvesting header 12 is conventional in the art and is operable to sever the standing crop, consolidate it and feed it rearwardly to the feeder housing 14, interconnecting the base unit 10 and the header 12 and providing a conduit for conveying crop material to the base unit 10. The feeder housing is generally hollow and houses a crop conveyor 15 driven by the conveyor drive 16 and having lugs 17 thereon for engaging crop material and conveying it along the feeder house floor 18. The direction of the feed path of the crop material along the feeder house floor 18 being shown by the arrow 19.

The electronic detection means 20 includes a sensing plate 22 shown in FIG. 1 as being mounted near the header 12 for early detection of non-crop foreign matter within the feed path. Upon detection of such foreign matter, the control box 23 emits a signal over wire 24 to the actuation means 25, shown in the form of a solenoid 26. The solenoid 26 activates the trip means 28 to cause a subsequent ejection of the foreign matter from the flow of crop material through the feeder housing.

Figure 3:
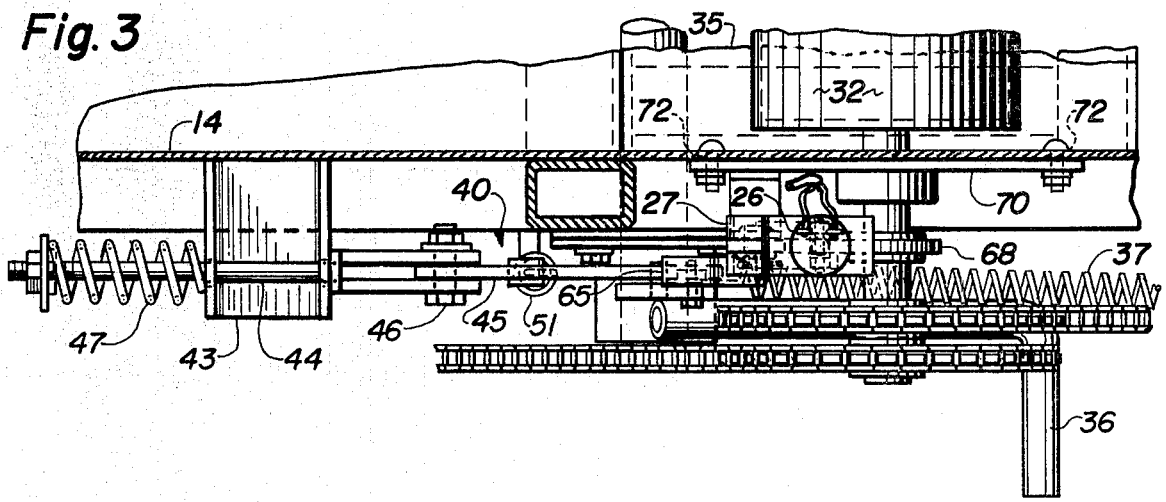
FIG. 3 is a top view of the side of the feeder housing seen in FIG. 2, corresponding to lines 3—3 of FIG. 2.

As can be seen in FIGS. 1, 2 and 3, the mechanical detection means 30 includes a pinch roller 32 mounted at a predetermined distance, indicated by the arrow 33, above the feeder house floor 18. Immediately beneath the pinch roller 32, the feeder house floor 18 includes a trap door 35 pivotally mounted on the feeder house 14 and moveable between a closed position 38, wherein the trap door 35 is contiguous to the feeder house floor 18 to permit crop to flow uninterruptedly, and an open position 39, shown in phantom, wherein an opening is provided in the feeder house floor 18 through which the foreign matter can be ejected from the feed path of the crop material. The trap door 35 includes a handle 36 projecting outwardly from the feeder house 14 for manual manipulation of the door 35 between the closed position 38 and the open position 39. The trap door 35 is shown as being biased toward the open position 39 by means of the spring 37 to provide a positive action for moving it from the closed position 38. However, since the open position 39 is vertically lower than the closed position 38, the trap door 35 could fall into the open position 39 merely by gravity without assistance of the force exerted by the spring 37.

The trap door 35 is held in the closed position 38 by a latching means 40, including a latch member 41 rigidly affixed to the trap door 35 and forming a part thereof to be pivotable therewith. The latching means 40 further includes a latch lock member 42 engageable with the latch member 41 to hold the trap door 35 in the closed position 38. The latch lock member 42 includes a support bracket 43 which slidably receives an elongated bar 44 therethrough. A catch member 45 is pivotally connected to the elongated bar 44 at the pivot connection 46 in line with the major axis of the bar 44. The spring 47 biases the elongated bar 44 for movement in the direction indicated by the arrow 48; however, as is particularly seen in FIG. 2, the elongated 44 is of a shape to engage with the bracket 43 and limit the amount of movement thereof in the direction 48. The catch member 45 includes a notch 49 formed therein to engage with the latch member 41 and hold the trap door 35 in the closed position 38. The spring 51 urges the catch member 45 toward engagement with the latch member 41.

The trip means 28, which is operatively associated with the electronic detection means 20, includes a trip link 29 having a first elongated member 52 pivotally connected by a pivot 53 at one end 54 thereof to the feeder house 14, with the remote second end 50 thereof positioned in close proximity to the latching means 40. A stop 55 is provided adjacent the second end 50 of the first member 52 to restrict the amount of movement thereof about pivot 53. A second elongated member 56 is slidably connected via a slot-shaped hole 57 to a bracket 58 which, in turn, is affixed to the first elongated member 52. The second member 56 is connected to the solenoid 26 and is moveable between a passive position, being the normal operating condition in which non-crop foreign matter has not been detected, and an activation position, when foreign matter has been detected by the electronic detecton means 20 for effecting the release of the trap door 35 from the latching means 40. The solenoid 26 is affixed to the end 54 of the first member 52 via a mounting bracket 27 and is pivotally moveable with the first member 52 about the pivot 53.

As can be seen in FIG. 2, a spring 59 interconnects the feeder house 14 and the second member 56 to urge the second member into the activation position. With this arrangement, it is contemplated that the solenoid will be operable, when energized, to hold the second member in the passive position. Should a power failure to the solenoid 26 be encountered, the second member 56 would automatically be moved into the activation position and the trap door 35 ultimately moved to the open position 39, thereby signaling the operator of the existence of the power failure. One skilled in the art should readily realize that a solenoid 26 could be provided to push the second member 56 into the activation position when energized. Accordingly, the spring 59 would have to be repositioned to urge the second member 56 into the passive position.

Referring again to FIGS. 1, 2 and 3, a release means 60 is operatively associated with the trip means 28 and the latching means 40 to effect the release of the catch member 45 from the latch member 41. As is best seen in FIG. 2, the release means 60 includes a roller 62 mounted on the first elongated member 52 for adjustment to or away from the pivot 53 and an inclined ramp 65 affixed to the catch member 45 and positioned in close proximity to the roller 62. In operation to effect the unlatching of the trap door 35, the roller 62 and the ramp 65 are caused to be engaged with one another and, as a result, the ramp 65 rides up over the roller 62 causing the catch member 45 to rotate about the catch pivot 46. This movement releases the catch member 45 from the latch member 41 and permits the trap door 35 of move into the open position 39.

A cam member 68 is affixed to the pinch roller 32 and continuously rotatable therewith during operation of the crop harvesting machine. The trip means 28 is positioned such that the second end 50 of the first elongated member 52 is located between the catch member 45 and the cam member 68. The stop 55 prevents the first member 52 from engaging the cam member 68. When the second elongated member 56 is in the passive position, the cam member 68 is not engageable therewith; however, when the second member 56 is moved into the activation position, the cam member 68 contacts the second member 56 and causes the first member 52 to swing about the pivot 53 away from the cam member 68 and toward the catch member 45.

The pinch roller 32 is rotatably mounted on a bearing plate 70 having slot-shaped holes 72 to enable adjustment of the pinch roller 32 relative to the trap door 35, so as to vary the distance 33 therebetween. The first elongated member 52 is pivotally connected to the bearing plate 70 so that the spacial relationship between the second elongated member 56 and the cam member 68 will not vary whenever the position of the pinch roller 32 is changed to adjust the distance 33. However, the roller 62 is adjustable relative to the first member 52 so that the positional relationship between the roller 62 and the inclined ramp 65 can be maintained whenever the position of the pinch roller 32 is adjusted.

Figure 4:
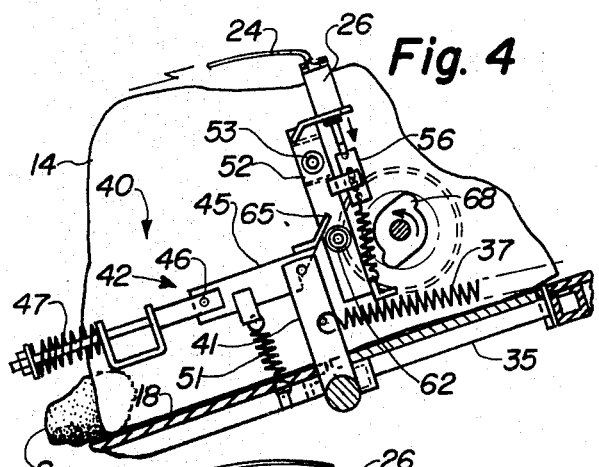
FIGS. 4, 5 and 6 are partial side elevational views of the feeder house corresponding to FIG. 2 and showing the sequential steps of the operation of the instant invention when the foreign matter is electronically detected, the initial step being shown in FIG. 4 and the final ejection of the matter being shown in FIG. 6.
Figure 5:
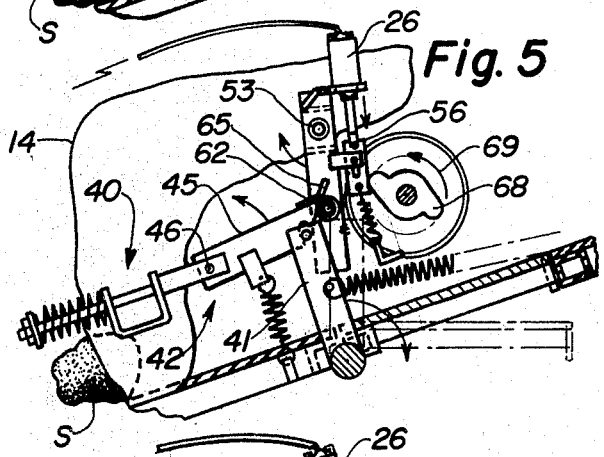
Figure 6:
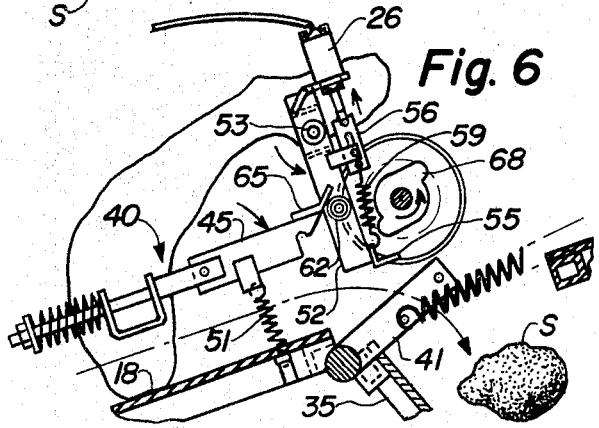

Referring now to FIGS. 4, 5 and 6, the operation of the instant invention to eject a stone having been detected by the electronic detection means 20 can be seen. FIG. 4 depicts the instant invention just as the stone S is being sensed by the electronic detection means 20. The catch member 45 of the latch means 40 is connected to the latch member 41, thereby holding the trap door 35 in the closed position 38 to maintain an uninterrupted flow of crop material. The solenoid 26 is permitting the second elongated member 56 to move from the passive position to the activation position.

In FIG. 5, the second member 56 has moved into the activation position and has been engaged by the cam member 68 rotating in the direction indicated by the arrow 69. The cam member 68 has forced the first member 52 to rotate about its pivot 53, thereby engaging the roller 62 into the inclined ramp 65 on the catch member 45. The engagement between the roller 62 and the ramp 65 causes the catch member 45 to rotate about its pivotal connection 46 with the elongated bar 44, and, as a result, forcing the catch member 45 to disconnect from the latch member 41 as the stone S approaches the trap door 35.

In FIG. 6, the trap door 35 has swung to the open position 39, allowing the stone S to be ejected from the flow of crop material. The solenoid 26 has been re-energized, drawing the second elongated member 56 back into the passive position. This permits the first elongated member 52 to be forced back into its normal position against the stop 55 by the spring 47 biasing the catch member 45 downwardly toward the latch member 41. At this point, it would be necessary for the operator to close the trap door 35, such as through the use of the handle 36, thereby reconnecting the latch member 41 with the catch member 45, to continue with the crop harvesting operation.

Figure 7:
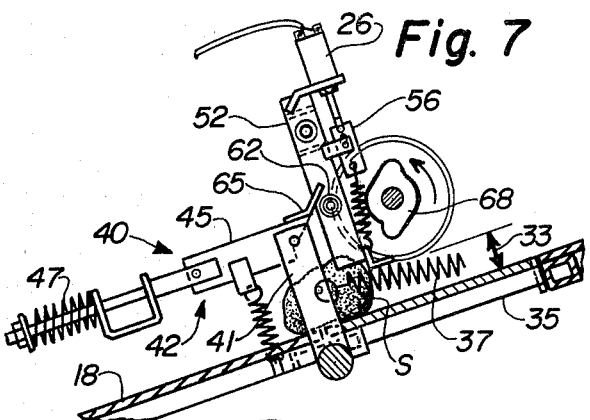
FIGS. 7, 8 and 9 are schematic side elevational views of the instant invention corresponding to FIG. 2 and showing the sequential steps of operation of the instant invention when the foreign matter is mechanically detected, the initial step being shown in FIG. 7 and the final ejection of the matter being shown in FIG. 9.
Figure 8:
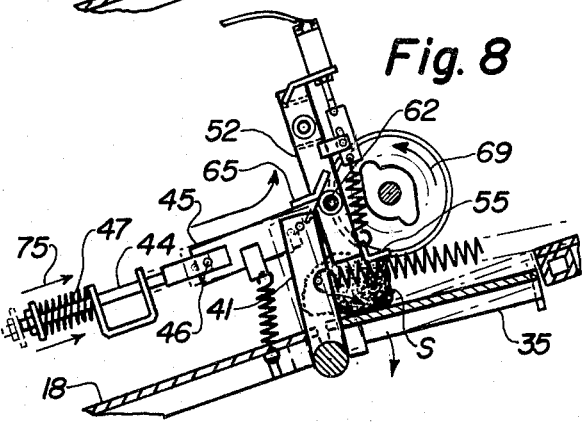
Figure 9:
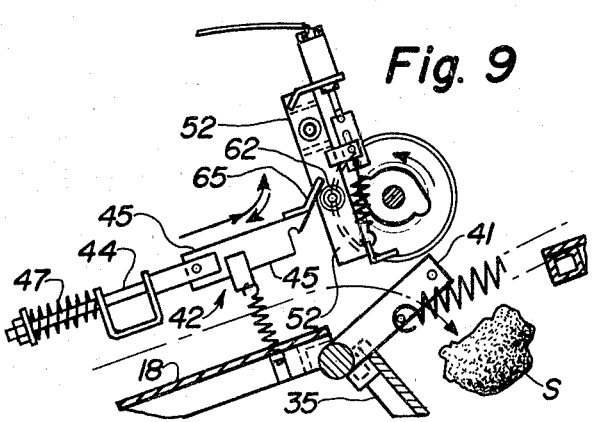

FIGS. 7, 8 and 9 depict the operation of the instant invention to eject a stone upon detection thereof by the mechanical detection means 30. As seen in FIG. 7, all components of the instant invention are in their normal operating position as seen in FIG. 4 and described relative thereto. The stone S has escaped detection by the electronic detection means 20 and is about to become engaged by the pinch roller 32.

In FIG. 8, the stone S passes beneath the pinch roller 32, forcing the trap door 35 to move from the closed position 38 toward the open position 39. This pivotal movement of the trap door 35 causes a corresponding motion in the latch member 41. Since the latch member 41 is still received within the notch 49 in the catch member 45, the elongated bar 44 and catch member 45 are moved substantially linerally in the direction indicated by arrow 75 against the bias imposed by the spring 47. This motion forces the inclined ramp 65 into engagement with the roller 62. Since the stop 55 prevents the first member 52 from rotating toward the cam member 68, the engagement between the roller 62 and inclined ramp 65 forces a pivotal movement of the catch member 45 about its pivot 46 to release the latch member 41 and to permit the trap door to move into the open position 39 as seen in FIG. 9. After the catch member 45 is disconnected from the latch member 41, the spring 47 forces the latch lock member 42 back into its original position. As with the operation of the instant invention described relative to FIGS. 4–6, the trap door 35 must be returned to its closed position 38 to continue the crop harvesting operation.

Figure 10:
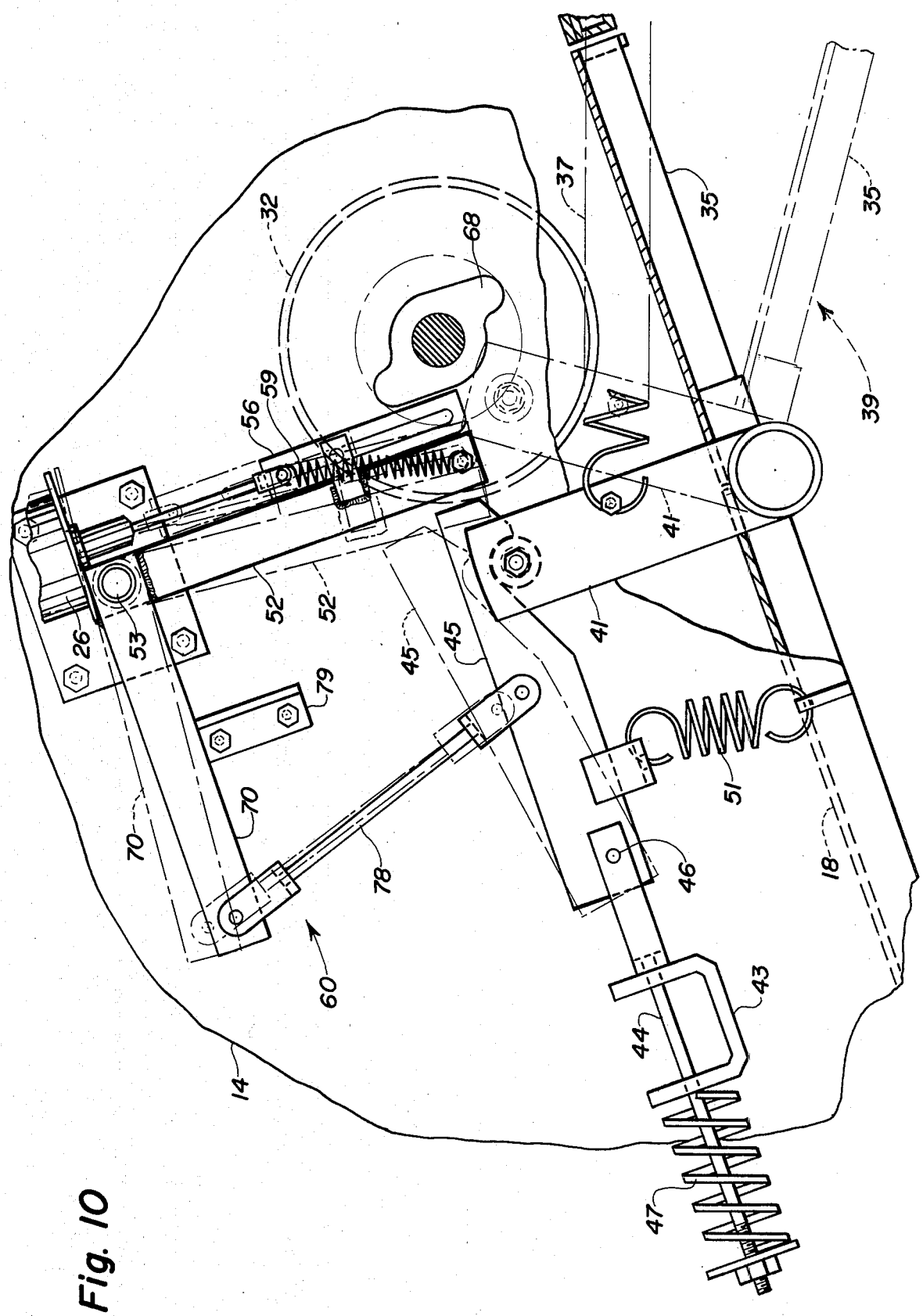
FIG. 10 is a schematic side elevational view of alternative embodiment of the instant invention, showing the operation thereof in phantom upon the electronic detection of the foreign matter.

Referring now to FIG. 10, an alternative embodiment of the instant invention can be seen. The trip means 28, the latching means 40, the solenoid 26, the trap door 35 and the cam member 68 are substantially as described heretofore. The release means 60, however, is comprised of a bell crank 77 rigidly affixed to the first member 52 at right angles thereto and a connecting link 78 interconnecting the bell crank 77 and the catch member 45. The movement of the bell crank 77 toward the catch member 45 is limited by a stop 79. As is shown in phantom, when the cam member 68 engages the second elongated member 56 to cause a pivotal motion of the first elongated member 52 about the pivot 53, the bell crank 77 is rotated therewith. The connecting link 78 effects a corresponding pivotal movement of the catch member 45 about its pivot 46 to disconnect the catch member 45 from the latch member 41.

Similar to that described above in reference to FIGS. 7, 8 and 9, when the pinch roller 32 forces foreign matter downwardly against the trap door 35, the latch member 41 pulls the latch lock member 42 toward the cam member 68. Since the connecting link 78 is of a fixed length and the bell crank 77 is prevented from movement toward the catch member 45 by the stop 79, the catch member 45 pivotally moves about its pivot 46 when it moves linerally toward the cam member 68 to effect the release of the latch member 41 and permit the trap door 35 to move into the open position 39. As noted above, to maintain the proper orientation between the release means 60 and the latching means 40, the length of the connecting link 78 would be adjustable to compensate for any adjustments to the position of the pinch roller 32.

Figure 11:
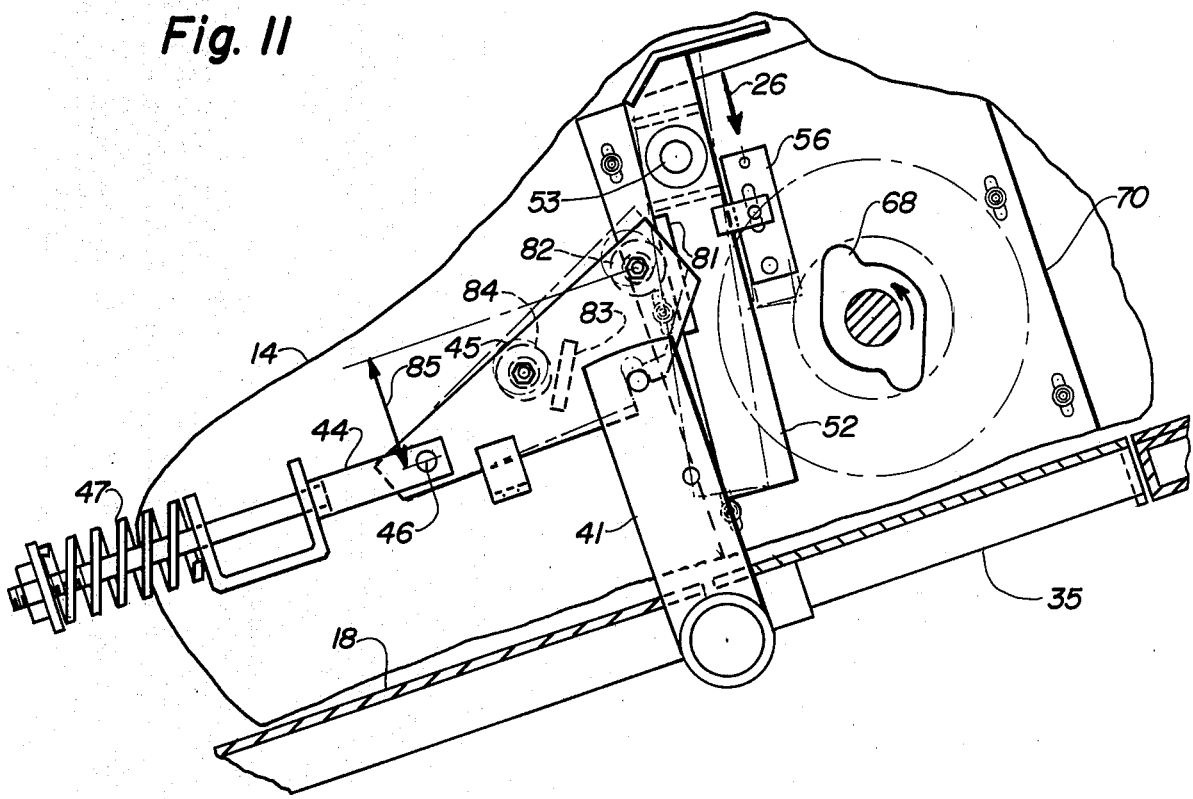
FIG. 11 is a schematic side elevational view of another alternative embodiment of the instant invention showing the operation thereof in phantom upon the electronic detection of the foreign matter.
Figure 12:
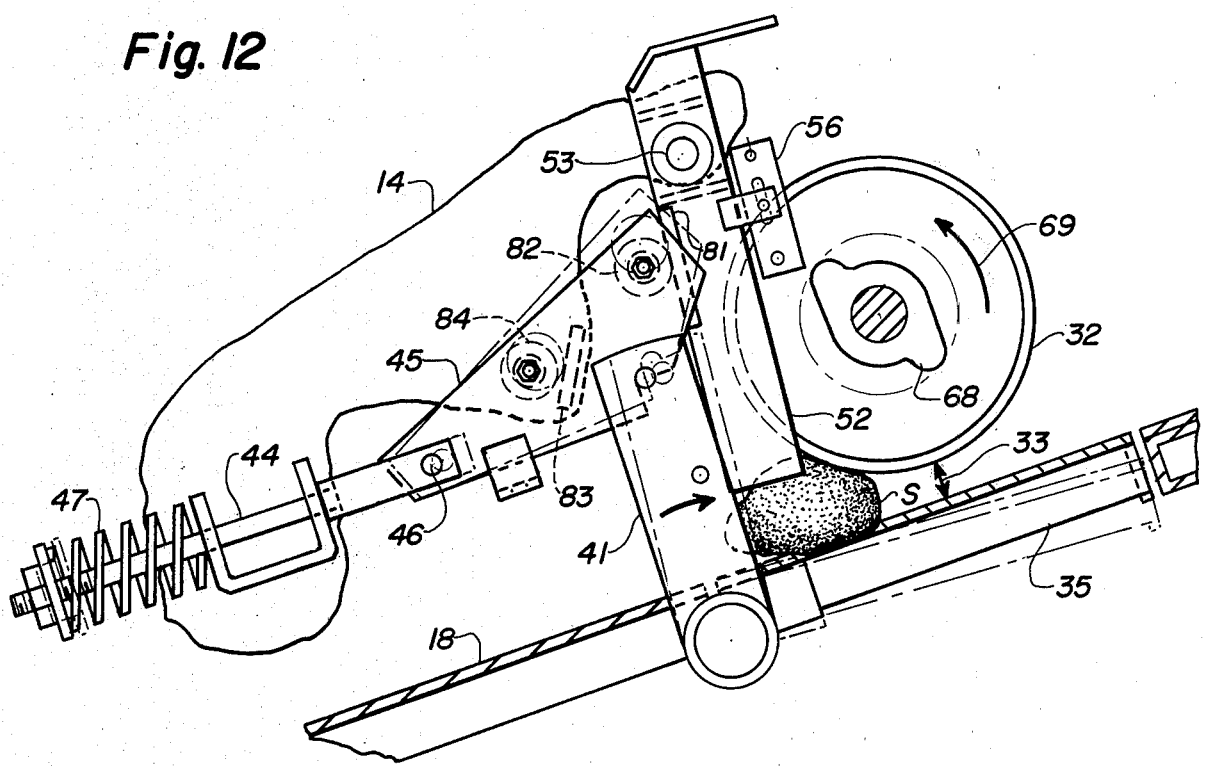
FIG. 12 is a schematic side elevational view of the alternative embodiment of the instant invention shown in FIG. 11, showing the operation thereof in phantom upon the mechanical detection of the foreign matter.

Referring now to FIGS. 11 and 12, another alternative embodiment of the instant invention can be seen. The trip means 28, the latching means 40, the trap door 35, the solenoid 26 and the cam member 68 are substantially as described above in reference to FIGS. 1-9. However, the release means 60 is comprised of a flange 81 projecting outwardly from the first elongated member 52 and a first roller 82 mounted on the catch member 45 in close proximity to the flange 81. To provide additional assistance to the operation described below, the release means 60 could also include an inclined ramp 83 affixed to the feeder house 14 and a second roller 84 mounted on the catch member 45 forward of the inclined ramp 83.

The operation of the release means 60 upon detection of non-crop foreign matter by the electronic detection means 20 is depicted in FIG. 11. When the cam member 68 engages the second elongated member 56, thereby rotating the first member 52 about its pivot 53, the flange 81 engages the roller 82. Because the roller 82 is not mounted in axial alignment with the major axis of the elongated bar 44, the resultant moment arm, relative to the pivot 46 as indicated by the arrow 85, effects a pivotal movement of the catch member 45 about its pivot 46 to release the latch member 41 and permit the trap door 35 to move into the open position 39.

The operation of the release means 60 upon the mechanical detection of non-crop foreign matter is depicted in FIG. 12. As described with respect to FIGS. 7-9, the movement of the trap door 35 toward its open position 39 causes the catch member 45 to move rearwardly toward the cam member 68. As a result of this movement, the roller 82 engages the flange 81 to cause a pivotal movement of the catch member 45 as described above relative to the electronic detection of the foreign matter. An advantage to this particular configuration is that adjustment of the bearing plate 70 to vary the distance 33 between the pinch roller 32 and the trap door 35 does not necessitate a corresponding adjustment of any of the other components in the release means 60.

As noted above, the catch member could include a second roller 84 engageable with an inclined ramp 83 affixed to the feeder house 14 to assist in pivotally moving the catch member 45 about its pivot 46 upon the mechanical detection of non-crop foreign matter. When the catch member 45 moves toward the cam member 68, the roller 84 rides up over the ramp 83 similar to the relationship described above relative to roller 62 and ramp 65. One skilled in the art will readily realize that a slight rearrangement of the position of the pivot 53 and the stop 55, such that the flange 81 would be inclined similar to the ramp 83, could also assist in effecting the pivotal movement of the catch member 45.

It will be understood that there is changes in the details, material, steps and arrangement of parts which have been described and illustrated and explained in the nature of the invention, will occur to and may be made by those skilled in the art upon a reading of the disclosure within the principals and scope of the invention. The foregoing description illustrates the preferred embodiment of the invention. However, concepts as based upon such description, may be employed in other embodiments without departing from the scope of the invention. Accordingly, the following claims are intended to protect the invention broadly as well as in the specific form shown.

Having thus described the invention, what is claimed is:

1. In a crop harvesting machine having a foreign matter detection mechanism for detecting non-crop foreign matter in the crop being harvested, a feeder housing having a feed path along which crop is conveyed during the harvesting process, and a foreign matter ejection mechanism including a trap door positioned beneath said feed path, said trap door being moveable between a closed position in which crop material flows uninterrupted along said feed path and an open position in which said non-crop foreign matter can be ejected from said feed path; said ejection mechanism further having a latching means operatively connected to said trap door to releasably hold said trap door in said closed position and a trip means operatively associated with said latching means and said foreign matter detection mechanism to release said trap door upon detection of said non-crop foreign matter so that said trap door can move to said open position for ejection of said non-crop foreign matter from said feed path, an improved trip means comprising:

a rotatable cam member mounted on said harvesting machine adjacent said latching means;

trip link mounted on said feeder housing between said cam member and said latching means, said trip link being moveable between a passive position wherein said trip link cannot engage said cam member and an activation position wherein said said trip link is engageable with said cam member, said trip link also being moveable when engaged with said cam member to cause the release of said trap door from said latching means;

release means operatively associated with said trip link and with said latching means to separate said latching means from said trap door and permit said trap door to move to said open position;

actuation means connected to said trip link and operatively associated with said foreign matter detection mechanism for moving said trip link between said passive position and said activation position upon detection of said non-crop foreign matter by said detection mechanism, such that when said trip link is moved into said activation position by said actuation means said cam member engages said trip link and causes movement thereof for effecting the release of said trap door from said latching means and permitting the ejection of said non-crop foreign matter; and drive means for rotating said cam member.

2. The crop harvesting machine of claim 1 wherein said trip link includes a first elongated member having a first end pivotally connected to said feeder housing and a remote second end positioned between said latch means and said cam member, said first member including a stabilizing means for preventing said first member from engaging said cam member, said trip link further including a second elongated member moveably connected to said first member and positionable between said passive position and said actuation position, said cam member being operable to rotate said first and second members about said pivot.

3. The crop harvesting machine of claim 2 wherein said second member is slidably connected to said first member, said second member being connected to said actuation means.

4. The crop harvesting machine of claim 3 wherein said release means includes a pivot arm rigidly affixed to said first elongated member at an angle thereto and pivotable therewith and a connecting link interconnecting said pivot arm and said latching means such that when said second member is engaged by said cam member and said first member and said pivot arm are rotated about said pivot, said connecting link pulls on said latching means to effect the release of said trap door.

5. The crop harvesting machine of claim 3 wherein said release means includes a roller mounted on said first member and an inclined ramp mounted on said latching means, said roller being engageable with said ramp when said first member is rotated about said pivot to effect a movement of said latching means and effect a release of said trap door.

6. The crop harvesting machine of claim 4 or 5 wherein said foreign matter detection mechanism electronically senses the presence of non-crop foreign matter in said feed path and emits a signal to said ejection mechanism, said actuation means being a solenoid which upon reception of the signal from said detection mechanism moves said second member into said actuation position.

7. The crop harvesting machine of claim 6 wherein said stabilizing means includes a stop affixed to said feeder housing to prevent said first elongated member from engaging said cam member and a spring interconnecting said first member and said feeder housing to urge said first member toward said stop.

8. The crop harvesting machine of claim 7 wherein said feeder housing includes a pinch roller rotatably mounted a distance above said trap door to force objects traveling along said feed path and having a height above said trap door greater than said distance downwardly against said trap door, said cam member being affixed to said pinch roller and rotatable therewith.

* * * * *